May 26, 1953  E. W. HEROLD  2,640,093
HIGH VOLTAGE MEASURING DEVICE
Filed Dec. 22, 1949
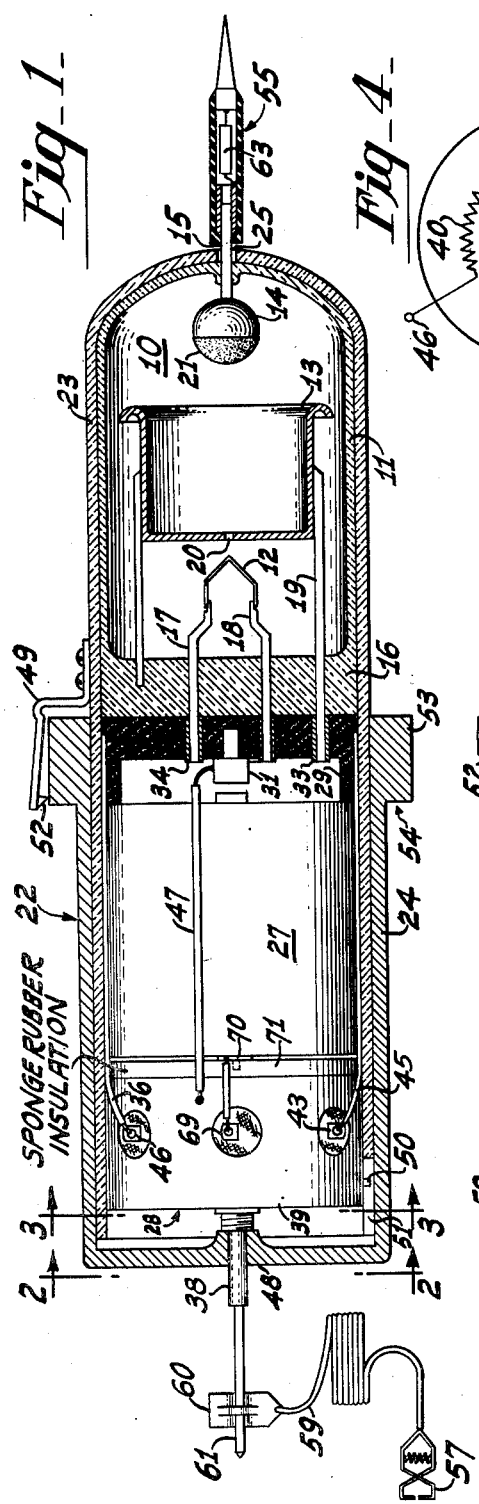
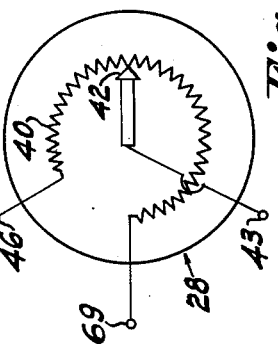
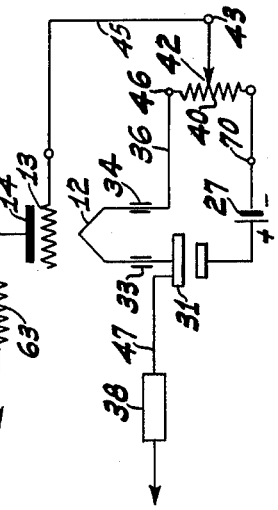
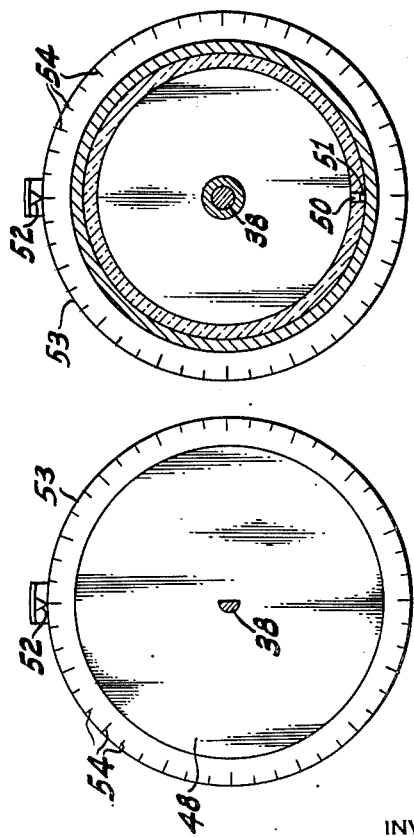
INVENTOR
*Edward W. Herold*
BY
*William A. Balcsak*
ATTORNEY Patented May 26, 1953

2,640,093

UNITED STATES PATENT OFFICE 2,640,093

HIGH VOLTAGE MEASURING DEVICE

Edward W. Herold, Kingston, N. J., assignor to Radio Corporation of America, a corporation of Delaware Application December 22, 1949, Serial No. 134,557

4 Claims. (Cl. 171—95)

1

This invention relates to voltage measuring devices and more particularly to easily-portable, low-cost instruments for measuring A. C. or D. C. voltages even of very great magnitudes with negligible loading of the source thereof.

In general, sensitive instruments which are used for measuring voltages of very large magnitudes are bulky and expensive. For example, one well known type includes a very high resistance voltage divider and, coupled to a portion of it, an indicator actuated by a current measuring D'Arsonval type of meter movement. In such an arrangement, due to the fact that the voltage divider must have very high resistance to avoid excessive loading of the source under test, the meter movement must be extremely sensitive, and sensitive meter movements of this type are expensive and easily damaged. Moreover, this type of instrument is often made even more expensive, and also rather bulky, by the inclusion of (1) a number of voltage dividers with an associated switching means for providing an extended useful range and (2) an amplifier for increasing input impedance and sensitivity. While the use of an amplifier permits the use of a cheaper, less-sensitive meter movement, the cost of the amplifier far exceeds the saving thus attained. Of course it is often necessary to test voltages at locations to which it is inconvenient and risky to carry bulky, expensive equipment.

It is an object of the present invention to devise a voltage measuring device the indicating means of which does not require the use of a D'Arsonval type of meter movement of any kind, i. e., neither an expensive sensitive one used without an amplifier nor a less-expensive, less-sensitive one used with an amplifier.

It is a further object of the present invention to devise an improved voltage measuring device capable of measuring voltages having a wide range of magnitudes without requiring a plurality of voltage dividers and a switching arrangement.

It is a further object of the present invention to devise a voltage measuring device which is unusually small and compact so that it is easily portable.

It is a further object of the present invention to devise a voltage measuring device employing a minimum number of component parts for attaining compactness and economy for example by employing a current-measuring component which is self-indicating.

It is a further object of the present invention to devise a voltage measuring device as set forth

2 in the preceding paragraph which utilizes a non-electro-mechanical indicator and requires a minimum of electrical energy for its operation whereby the device can be designed to impose the least possible load on the voltage source being measured.

It is a further object of the present invention to devise a voltage measuring device as set forth above which is suitable for measuring D. C. voltages of either positive or negative polarity and also the peak magnitude of A. C. voltages.

It is a further object of the present invention to devise a special purpose discharge device suitable for use in a voltage measuring device of the type set forth herein.

Other objects, features and advantages of the present invention will be apparent to those skilled in the art from the following detailed description of the invention and from the drawing in which:

Fig. 1 represents an embodiment of the invention;

Figs. 2 and 3 are cross sectional representations of the embodiment shown in Fig. 1 taken in the planes 2—2 and 3—3 as indicated in Fig. 1; and Figs. 4 and 5 are schematic diagrams representing respectively a part of the circuit and the entire circuit of the embodiment of Fig. 1.

Fig. 1 is a scaled-up representation of a pocket-type of measuring device embodying the present invention. This device includes a novel discharge device, triode 10, which is capable of controlling discharges caused by anode potentials of extremely large magnitudes by the use of grid biases of very small magnitudes and which is self-indicating as to whether or not any discharge is occurring. To these ends this discharge device is constructed (a) to have a very high mu or amplification factor and (b) to include an element which luminesces during any significant electron discharge. Triode 10 includes within an evacuated envelope 11 a cathode 12, which may be a directly heated filament, a control electrode 13 (which will also be referred to herein as the control "grid" 13) and an anode 14. Anode 14 is supported on a rod 15 which extends through the envelope 11 at a point which is well spaced from the press 16 through which the cathode heater leads 17, 18, and the grid lead 19 extend to form external terminal pins. This is desirable since in the operation of this device there may be a very great potential difference between the anode and either the cathode and grid (the cathode and the grid will be at substantially the same voltage) and therefore the glass-surface leakage-paths should be as long as possible. In the specific form shown herein the envelope 11 has the shape of an elongated cylinder with the press 16 at one end and with the anode support rod extending out of the other. By way of example anode 14 is shown to be spherical, this being preferred inasmuch as it will lessen the likelihood of any cold discharge. In the same way, control electrode 13 is made with rounded polished front edges to reduce the possibility of cold discharge.

The control electrode 13 may be considered as comprising an almost completely-effective shield between the anode and cathode. It includes a small opening 20 through which some of the field produced by a very high anode potential may fringe in the direction of the cathode so that in effect it will "see" a very small part of that high potential. Because of this, it is possible to control the anode current by grid-to-cathode potential variations of extremely small magnitudes and, where desired, to cut off entirely with a D. C. bias of the order of perhaps 3/4 of a volt. In other words, with this type of arrangement very large values of amplification factor can be attained. In designing a triode of this type it should be borne in mind that the mu will depend primarily on the distance between the anode 14 and the opening 20 and the smallness of the opening. The distance from the cathode 12 to the opening 20 does not substantially affect the mu but for a given mu it has a very material effect on the discharge current for any given bias value above cut-off.

A fluorescent coating 21 is carried on the side of anode 14 which faces the opening 20. It serves as an indicator of whether or not the tube is drawing current. In order to attain the closest possible approach to zero current before fluorescence ceases the coating 21 should be formed of an efficient phosphor. A suitable material is Willemite since it fluoresces for relatively small electron energies and does so in a color to which the eye is very responsive.

In the device of Fig. 1 the triode 10 is carried within one end of an elongated cylindrical holder 22, having an outward appearance somewhat like that of a pocket flashlight, which comprises an inner cylinder 23 and an outer cylinder 24. The inner cylinder 23 is open at one end and closed at the other except for a small opening 25 through which the rod 15 is intended to protrude when, in assembling the device, the triode 10 is inserted in the holder. Other components comprise a dry cell 27 which provides both cathode heater current and biasing potentials to the triode 10 and a potentiometer 28 which controls what part of the direct potential of the dry cell 27 is applied to the triode as grid bias. In addition there is provided intermediate the dry cell 27 and the triode 10 an arrangement whereby the former is automatically taken out of circuit when the measuring device is not in use. This arrangement consists of a cup-shaped spacer 29, formed of resilient material such as rubber, the bottom portion of which comprises an enabling contact 31 (which is to be described below) and a receptacle for the terminal pins of the triode 10 and the remainder of which provides a means for normally maintaining an open circuit between the positive terminal of the dry cell 27 and the enabling contact 31 and for permitting this open circuit to be closed when the dry cell is urged toward the right with a force sufficient to compress the cylindrical walls of the resilient spacer. It should be noted that the dry cell 27, the potentiometer 28 and a number of other parts such as shafts, rods, wires and terminals are not shown in section. One of the parts not shown in section is the enabling contact 31 which is carried in the center of the inside surface of the bottom of the spacer 29. It is shallow enough so as not to contact the positive terminal of the dry cell 27 when the side walls of the spacer are not under compression and are therefore effective to maintain the cell 27 in the position shown in the drawing. The contact 31 is electrically connected to one of the two sleeve-shaped terminals 33, 34, which are positioned to receive the terminal pins formed at the ends of filament leads 18, 17. The other of these two sleeve-shaped terminals (34) is connected to one end of an insulated ribbon-shaped conductor 36 which extends along the holder 22 between the inside wall of the inner tube 23 and the dry cell 27 to a point where its other end is connected to one end-terminal 46 of the resistive element 40 (see Fig. 4) of the potentiometer 28. The other end-terminal 69 of the potentiometer is connected to the negative pole, i. e., the outer zinc casing of the dry cell 27 by a contact 70. Contact 70 is carried by a resilient electric spacer 71 which serves to insulate the casing of the potentiometer 28 from that of the dry cell 27. From the foregoing it is seen that heater energy can be supplied to the filamentary cathode 12 by urging the cell 27 rightward against the contact 31. The circuit is then such that the filament 12 is in series with potentiometer 28 across the battery.

A suitable circuit arrangement for the potentiometer 28 is shown in Fig. 4. The shaft 38, and the casing 39 are electrically connected together and, by a ribbon-shaped connector 47 are connected to enabling contact 31. It will be seen that the above-indicated connection of the shaft 38 to the enabling contact 31 and hence, through terminal 33, to filament 12 permits the shaft 38 to be used as a probe when the device is utilized for measuring negative direct potentials. A sliding contact 42 is insulatingly mounted on the shaft 38 and engages different points along the resistive element 40 according to rotations of the shaft. This contact is connected to an external terminal 43 which in turn is connected to the grid 13 over an insulated wire 45 which may be ribbon-shaped so that it can conveniently fit between the side of the dry cell 27 and the inside surface of the inner tube 23. If desired, the inner tube 23 may be formed with a number of longitudinal ribs or lands (not shown) for carrying the dry cell 27 and the potentiometer 28 concentrically within the inner tube 23 at a sufficient distance from its inner surface to provide room for the potentiometer terminals and the wires which extend from them toward the triode 10. It will be noted that whenever the cell 27 is moved rightward so as to supply heater energy to the filament 12 its current will, at the same time, pass through the resistive element of the potentiometer 28.

The outer cylinder 24 is fitted over the inner cylinder 23 so that the two may telescope together and so that a hole in the center of the end 48 of the outer cylinder can engage the shaft 38. Because of this the position of the sliding contact 42 along the resistive element 40 can be controlled by rotation of the outer cylinder 24 with respect to the inner cylinder 23.

In order to key the potentiometer casing 39 against free rotation with the inner cylinder 23, it is provided with an external pin 50 which extends for a short distance in a radial direction to engage a slot 51 in the left end of the cylinder 23.

In the assembly of the device the terminal pins of the triode 10 may be forced into engagement with the receptacle at the bottom of the spacer 29 and the sub-assembly thus formed may be inserted partway into the outer cylinder 23; the dry cell 27 may be placed into the position between the spacer 29 and the potentiometer 28 and the entire assembly comprising the triode, the spacer, the dry cell and the potentiometer may be pushed rightward until the rod 15 extends out of the opening 25. The outer cylinder 24 may then be pushed over the left end of the inner cylinder to a sufficient extent to engage the shaft 38 in the opening in its end 48.

A latch 49 which may be made of spring brass or steel has one of its ends appropriately fastened to the outside of the inner tube 23 so that a pointer which protrudes inwardly from a point near its other end will engage a shoulder 53 formed on the right end of the outer tube 24 when the two tubes have been telescoped together to urge the positive terminal of the dry cell 27 against the enabling contact 31. In locking this testing device in its operating condition the pointer 52 moves inward to a position where it can also serve as a reference for a voltage scale 54 calibrated on the left surface of the shoulder 53.

The scale 54 of a completely-assembled representative sample of this device should be calibrated against high voltages of known values and, if the component parts of later-produced similar devices are held to reasonable standards, this scale may be used as a guide for calibrating the scales thereof.

It is assumed that the cylinder 23 is formed of insulating material and that it is either transparent or translucent in the region of the anode 14. However, if desired it may be of opaque insulating material formed with a number of openings so positioned that light from the anode may be seen therethrough.

It will be noted that in this arrangement long leakage paths are provided between the rod 15 and the shaft 38 respectively and the central portion of the device, i. e., the shoulder 53. In this way, if the device is manipulated from its central portion, there will be excellent protection for the operator even against extremely high voltages applied to the conductive elements at either of its ends.

A probe attachment 55 is shown connected to the anode end of the device, i. e., appropriately connected for the measurement of positive direct potentials. A grounding clip 57 is shown in Fig. 1 which is to be used for connecting the testing device to some reference point of the source under test, such as to the chassis of a television receiver or the negative side of a high voltage power supply. Clip 57 is connected over a wire 59 to a terminal 60 (which consists of an extension of the shaft 38) to prepare the device for measuring positive direct potentials. In preparing the device to measure negative voltages the positions of the probe attachment 55 and the terminal 60 are interchanged.

Within the probe attachment 55 there is a resistor 63 of very high resistive value for limiting the current which can pass through the device even if the grid bias should happen to be at a value substantially above cut-off at a time when the probe is first applied to the source of unknown potential, i. e., before it has been adjusted to cut off. A suitable typical value might be of the order of 25 megohms since for this value the current would be limited to one milliampere in measuring a direct potential of 25 thousand volts.

The circuit of this device as it has been described above is perhaps best understood with reference to Fig. 5.

From the foregoing it is apparent that this device can also be used to measure A. C. potentials. In fact it is particularly suitable for measuring the potentials of very high frequency energy inasmuch as the grid-anode inter-electrode capacitance is extremely small. Thus it is seen that both the resistive and reactive components of the input impedance of this device are very high. In measuring an A. C. potential the indication obtained would be proportionate to the peak magnitude of the positive or negative swings depending on which end of the device is used as its probe end.

In using this device, it is first locked in its operating condition and the clip 57 is attached to a reference potential point, such as ground, of the potential source under test; the probe attachment is brought into contact with the point of the source the potential of which is to be measured; the outer sleeve 24 is rotated back and forth with respect to the inner sleeve 23 until a point is found between two regions of rotation in which the coating 21 is respectively fluorescent and non-fluorescent; and the voltage calibration for the part of scale 54 which is aligned with the pointer 52 is read off. Since, in general, $E_{anode} = mu \times bias$, the measured anode voltage should be a value approximately equal to the mu of triode 10 multiplied by the bias which is applied as a result of the final setting of potentiometer 28. However, it should be remembered that the value of mu may change rather substantially in the region near the cut-off. In fact, it is for this reason that empirical calibration of this device is indicated. Nevertheless, for initial design purposes, if a normal drop of ½ volt occurs across filament 12, a bias of 1 volt is available across the potentiometer 28. Thus the triode 10 should have a mu of the order of the maximum anode voltage to be measured, i. e., for a 25 kv. maximum, the mu should be about 25,000.

While a specific embodiment has been illustrated and described, it will be understood that various changes and modifications may be made therein without departing from the spirit and scope of the invention.

What I claim as new is:

1. A discharge device comprising an elongated vacuum envelope containing along its interior in the order named a filamentary cathode, a control electrode and an anode; a conductive rod sealed through one end of said envelope with its outer end extending beyond the outside surface thereof as an anode terminal; said anode being supported on the inner end of said rod; said control electrode comprising a metallic cylindrical tube positioned with its axis extending in the end-to-end direction of said envelope and having an open end which faces the anode and comprises a smooth rim for minimizing field emission between said tube and the anode; said control electrode further comprising a disc-shaped closure which extends transversely to said tube and is imperforate but for a very small hole near said axis and in alignment with said cathode and anode; all the portion of said anode which faces said rim having a smooth surface for minimizing field emission between the anode and control electrode; a fluorescent coating on a surface of said anode facing the cathode; a pair of leads for said cathode; and a lead for said control electrode, all of said leads extending from the far end of said envelope from said conductive rod.

2. A pocket type voltage measuring instrument comprising a discharge device as in claim 1; a small number of dry cell batteries as a source of bias potential; the diameters of said hole and said tube being small enough in combination with the length of the tube being great enough, all with respect to the distance between the hole and the anode, so that said bias potential can cut off the anode current of the device for anode-to-cathode potentials up to several tens of thousands of volts; a potentiometer connected across said source and connected to said device for controlling what portion of said bias potential is applied between said control electrode and cathode; a scale associated with said potentiometer and calibrated to indicate the approximate values of respective anode-to-cathode potentials for which different adjustments of said potentiometer provide biases which just cut off the discharge current.

3. A voltage testing instrument as in claim 2 which further comprises an elongated hollow cylindrical holder containing said discharge device within one end of its interior with said anode terminal extending therethrough; said source of potential and said potentiometer being contained within the interior of the other end of said holder; a second probe extending from said last-mentioned end of the holder and connected to the cathode of said discharge device; said source of potential, said filamentary cathode and said potentiometer being connected in a closed series circuit; said potentiometer having a sliding tap which is connected to said control electrode.

4. A voltage testing instrument as in claim 3 which further comprises a current-limiting probe which includes two terminals, one of which is connectable to said anode terminal, and a resistance element having resistance value of the order of tens of megohms connected between the two terminals of the probe.

EDWARD W. HEROLD.

References Cited in the file of this patent

UNITED STATES PATENTS

| Number | Name | Date |
|---|---|---|
| 1,994,726 | Orth | Mar. 19, 1935 |
| 2,108,880 | Braden | Feb. 22, 1938 |
| 2,128,632 | Eaton | Aug. 30, 1938 |
| 2,435,316 | Larson | Feb. 3, 1948 |
| 2,495,035 | Szegho | Jan. 17, 1950 |
| 2,509,815 | Elliot | May 30, 1950 |

FOREIGN PATENTS

| Number | Country | Date |
|---|---|---|
| 338,486 | Italy | Mar. 31, 1936 |
| 150,902 | Austria | Oct. 11, 1937 |